United States Patent
Cox et al.

(10) Patent No.: US 8,332,761 B2
(45) Date of Patent: Dec. 11, 2012

(54) MULTIPLE PROFILES FOR A USER IN A SYNCHRONOUS CONFERENCING ENVIRONMENT

(75) Inventors: Susan M. Cox, Rochester, MN (US); Janani Janakiraman, Austin, TX (US); Fang Lu, Billerica, MA (US); Kumar Ravi, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 11/971,201

(22) Filed: Jan. 8, 2008

(65) Prior Publication Data

US 2009/0177974 A1 Jul. 9, 2009

(51) Int. Cl.
*G06F 17/00* (2006.01)
(52) U.S. Cl. .......... 715/753; 715/758; 715/759; 715/750
(58) Field of Classification Search .................. 715/758, 715/750, 273, 759, 753
See application file for complete search history.

(56) References Cited

U.S. PATENT DOCUMENTS

| | | | |
|---|---|---|---|
| 6,738,908 B1 * | 5/2004 | Bonn et al. ..................... 726/4 |
| 7,027,463 B2 | 4/2006 | Mathew et al. | |
| 7,610,055 B2 * | 10/2009 | Erhart et al. .................. 455/463 |
| 8,095,664 B2 * | 1/2012 | Yamaguchi et al. .......... 709/227 |
| 2003/0126108 A1 | 7/2003 | Martino et al. | |
| 2005/0114783 A1 | 5/2005 | Szeto | |
| 2006/0179410 A1 * | 8/2006 | Deeds .......................... 715/750 |
| 2007/0121869 A1 | 5/2007 | Gorti et al. | |
| 2007/0130275 A1 | 6/2007 | Maresh | |
| 2007/0168447 A1 | 7/2007 | Chen et al. | |
| 2007/0168863 A1 * | 7/2007 | Blattner et al. ............... 715/706 |
| 2007/0185967 A1 | 8/2007 | Hayes, Jr. | |
| 2007/0214001 A1 | 9/2007 | Patron et al. | |
| 2008/0167016 A1 * | 7/2008 | Swanburg et al. ......... 455/414.1 |
| 2009/0055374 A1 * | 2/2009 | Surazski et al. ................. 707/5 |
| 2009/0216551 A1 * | 8/2009 | Chen et al. ....................... 705/1 |

FOREIGN PATENT DOCUMENTS

CN 101047662 A 10/2007

OTHER PUBLICATIONS

Olesen et al., "The Conceptual Structure of User Profiles", Doc. No. MAGNET/BMP1.2/DTU/D1.2.1/R/PU/001/02.10.2006, pp. 1-107.

* cited by examiner

*Primary Examiner* — Stephen S. Hong
*Assistant Examiner* — Matthew Ludwig
(74) *Attorney, Agent, or Firm* — Ido Tuchman; Steven Bennett

(57) ABSTRACT

A method, system, and computer program product for managing multiple profiles in a synchronous conferencing system. A synchronous conferencing account is provided for a first user of the synchronous conferencing system. The synchronous conferencing account includes a plurality of user profiles for the first user. The user profiles identify the first user differently. Each user profile is associated with one or more data fields identifying the first user. The data fields may include any or all of a name, a nickname, a login name, and an avatar. A request from a second user of the synchronous conferencing system to communicate with the first user is received. The request includes an identification of the second user. One of the user profiles is selected based on the identification of the second user. The data fields associated with the selected user profile are transmitted to the second user.

20 Claims, 6 Drawing Sheets

MULTIPLE PROFILES FOR A USER IN A SYNCHRONOUS CONFERENCING ENVIRONMENT

FIELD OF THE INVENTION

The present invention relates generally to synchronous conferencing. More specifically, the present invention relates to a method, system and computer program product for managing multiple profiles for a user in a synchronous conferencing environment.

BACKGROUND

Synchronous conferencing is a class of communication techniques which are widely used on the Internet and other interactive computing networks. Synchronous conferencing allows two or more users to communicate in real time. Specifically, a user sends a message to another user through a synchronous conferencing application or computer program. The latter user ideally responds to the message within a short period of time, typically seconds or minutes at the most. Thus, synchronous conferencing facilitates a conversation back and forth between users.

Messages exchanged in synchronous conferencing systems generally contain textual data. However, many synchronous conferencing systems known in the art additionally allow exchanging other types of multimedia content. The messages are typically short in length. In modern synchronous conferencing systems, a typical message is one sentence or several words in length. However, a message may be several sentences long or, at the other extreme, may consist of a single character. Frequently, multiple messages which are part of the same conversation are exchanged within a session. The session beneficially groups the related messages together and provides context. The activity within a session, including any messages and any other activity, is frequently displayed within a window in a graphical user interface (GUI).

Synchronous conferencing has notable differences compared to electronic mail. Broadly speaking, electronic mail has many similarities to traditional written communication, while synchronous conferencing has many similarities to oral communication. Synchronous conferencing generally occurs in real-time, while electronic mail is generally asynchronous. In contrast to the rapid response common to synchronous conferencing, a delay of hours or even days is common before receiving a response to an electronic mail message. Additionally, synchronous conferencing generally uses different protocols than electronic mail. Electronic mail on the Internet is generally transmitted using the Simple Mail Transfer Protocol (SMTP), the Post Office Protocol (POP) and/or the Internet Message Access Protocol (IMAP). By contrast, synchronous conferencing typically employs an Internet Relay Chat protocol or a proprietary protocol. These differences cause synchronous conferencing to be well suited to tasks where electronic mail is a suboptimal communication modality. As a result, synchronous conferencing plays an important role within the Internet and other interactive computing networks.

Examples of synchronous conferencing systems known in the art include the AOL Instant Messenger™ service, the Google Talk™ synchronous conferencing service, the ICQ® service, the MSN® Messenger service, and the Yahoo!® Messenger service. AOL Instant Messenger is a trademark of AOL LLC, Dulles, Va., United States. Google Talk is a trademark of Google Inc., Mountain View, Calif., United States. ICQ is a registered trademark of AOL LLC, Dulles, Va., United States. MSN is a registered trademark of Microsoft Corporation, Redmond, Wash., United States, in the United States and/or other countries. Yahoo! is a registered trademark of Yahoo! Inc., Sunnyvale, Calif., United States.

A notable type of synchronous conferencing system is a chat room. A chat room allows a plurality of users to communicate with each other. A user may join a chat room. While joined, the user receives messages transmitted to the chat room by any other user who is also joined to the chat room. The user may likewise transmit messages to the chat room so that they are received by every other user of the chat room. A chat room is frequently created in order to discuss a specific topic or area of interest by multiple participants.

Another notable synchronous conferencing system is the Internet Relay Chat, commonly abbreviated as IRC. IRC has existed since the early days of the Internet and is still in widespread use today. IRC clients are available for a wide variety of system architectures and operating systems. An IRC network includes one or more servers. To connect to the network, a user connects to a specific server. An IRC network offers a plurality of channels, each of which is similar in nature to a chat room. Moreover, IRC also allows messages to be transmitted between two or more individual users. IRC is frequently used to create networks which are open to the public. Alternatively, IRC may beneficially be employed to create internal networks which are only available to a defined group, e.g., a corporation.

In many synchronous conferencing systems known in the art, each user has a profile containing identity information about the user. The profile may include a nickname for the user. In many synchronous conferencing systems known in the art, it is customary for users to be identified primarily by a nickname instead of by their actual name. Of course, a user may set his or her nickname to be their legal name. In some synchronous conferencing systems, a nickname is referred to as a handle or, in the case of IRC, a nick. A profile may also include an image known as an avatar. An avatar is any image which represents a particular user of a synchronous conferencing system. The profile may also include a message conveying the status of the user. A status message may, for example, indicate that the user is available, in a meeting, busy or entirely offline.

The profile may be viewable by other users of the synchronous conferencing system. Additionally, when a user sends a message, a subset of the user's profile may be transmitted along with the message. In particular, many synchronous conferencing systems known in the art display the nickname and avatar of the user who transmitted a message near the content of the message.

The same user may interact with different types of people. For example, a user may employ the same synchronous conferencing system to interact with both professional contacts and personal friends. In this case, the user may wish to display different identity information to each type of contact. For example, a user may wish to use a nickname and avatar which are appropriate to a professional setting when interacting with professional contacts. By contrast, the same user may wish to use a nickname and avatar which are less serious in nature when interacting with personal friends.

A limitation of many synchronous conferencing systems known in the art is that each user has only one profile. Thus, the same identity information is shown to all other users regardless of the relationships between the users. Due to this limitation, many users of synchronous conferencing systems known in the art configure entirely separate accounts or environments for different roles. In the example above, the user would need to create two separate accounts. The first account would contain the identity information appropriate to a professional setting, and the second account would contain the identity information appropriate to a personal setting. Furthermore, to interact appropriately with different types of people simultaneously, it is necessary to log in to multiple accounts simultaneously. Clearly, maintaining multiple separate accounts and performing multiple simultaneous logins is disadvantageous because it increases administrative complexity and resource usage.

SUMMARY OF THE INVENTION

The present invention addresses the above-mentioned limitations of the prior art by introducing techniques for managing multiple profiles within a single account in a synchronous conferencing environment. This advantageously allows interacting with different users in a manner appropriate to each user within the same account at a synchronous conferencing system. For example, embodiments of the present invention allow interaction with professional contacts in a professional manner and personal contacts in a personal manner within the same account. The present invention also advantageously allows restricting information in the same account so that it can only be viewed by a subset of users of the synchronous conferencing system. For example, some identity information may be blocked from users with whom no previous relationship exists.

Thus, one exemplary aspect of the present invention is a method for managing multiple profiles in a synchronous conferencing system. The method comprises providing a synchronous conferencing account for a first user of the synchronous conferencing system. The synchronous conferencing account includes a plurality of user profiles for the first user. At least two of the user profiles identify the first user differently. The method further comprises associating each of the plurality of user profiles with one or more data fields identifying the first user. The data fields may include any or all of a name, a nickname, a login name, and an avatar. The method further comprises receiving a request from a second user of the synchronous conferencing system to communicate with the first user. The request includes an identification of the second user. The method further comprises selecting one of the user profiles of the first user based on the identification of the second user. The method further comprises transmitting the one or more data fields identifying the first user and associated with the selected user profile to the second user.

Another exemplary aspect of the present invention is a system for managing multiple profiles in a synchronous conferencing system. The system comprises a microprocessor configured to execute program code embodied in computer readable memory. The system further comprises a synchronous conferencing account for a first user of a synchronous conferencing system. The synchronous conferencing account includes a plurality of user profiles for the first user. Each of the user profiles is associated with one or more data fields that identify the first user. The data fields may include any or all of a name, a nickname, a login name, and an avatar. At least two of the user profiles identify the first user differently. The system further comprises a receiving unit configured to receive a request from a second user of the synchronous conferencing system to communicate with the first user. The request includes an identification of the second user. The system further comprises a selecting unit configured to select one of the user profiles of the first user based on the identification of the second user. The system further comprises a transmitting unit configured to transmit the one or more data fields identifying the first user and associated with the selected user profile to the second user.

Another exemplary aspect of the present invention is a computer program product embodied in a tangible media comprising computer readable program codes coupled to the tangible media for managing multiple profiles in a synchronous conferencing system. The computer readable program codes are configured to cause the program to provide a synchronous conferencing account for a first user of the synchronous conferencing system. The synchronous conferencing account includes a plurality of user profiles for the first user. At least two of the user profiles identify the first user differently. The computer readable program codes are further configured to cause the program to associate each of the user profiles with one or more data fields identifying the first user. The data fields may include any or all of a name, a nickname, a login name, and an avatar. The computer readable program codes are further configured to receive a request from a second user of the synchronous conferencing system to communicate with the first user. The request includes an identification of the second user. The computer readable program codes are further configured to select one of the user profiles of the first user based on the identification of the second user. The computer readable program codes are further configured to transmit the one or more data fields identifying the first user and associated with the selected user profile to the second user.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
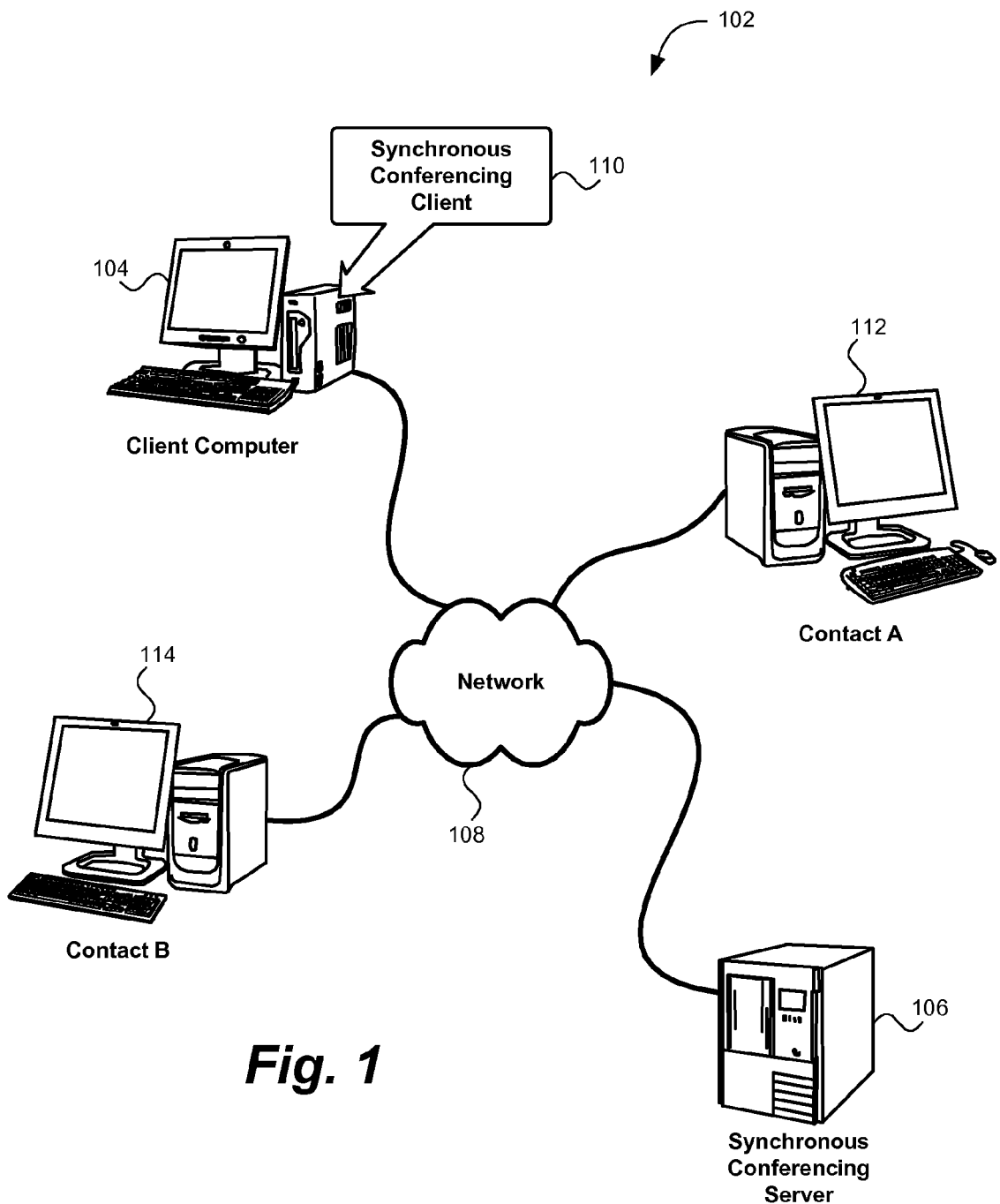
FIG. 1 shows one configuration of an exemplary environment embodying the present invention.

The following description details how the present invention is employed to manage multiple profiles for a user in a synchronous conferencing environment. Throughout the description of the invention reference is made to FIGS. 1-6. When referring to the figures, like structures and elements shown throughout are indicated with like reference numerals.

FIG. 1 shows an exemplary environment 102 in which an embodiment of the present invention can be implemented. The environment 102 includes a client computer 104 coupled to a synchronous conferencing server 106 via a computer network 108. The client computer 104 includes a synchronous conferencing client 110 configured to send and receive messages over the computer network 108.

The computer network 108 may be a Local Area Network (LAN), a Wide Area Network (WAN), or a combination thereof. It is contemplated that the computer network 108 may be configured as a public network, such as the Internet, and/or a private network, such as an intranet. The computer network 108 may include various topologies and protocols known to those skilled in the art, such as TCP/IP. Furthermore, the computer network 108 may include various networking devices known to those skilled in the art, such as routers, switches, bridges, repeaters, etc. It will be appreciated that the network connections shown are illustrative and other means of establishing a communications link between sites may be used, such as ad hoc wireless connections.

The synchronous conferencing client 110 is a computer program configured to perform synchronous conferencing functions such as displaying the status of contacts in a contact list, establishing communication sessions with other synchronous conferencing clients, and providing user interfaces for carrying out synchronous conferencing communication. It is noted that a contact list is frequently known in the art as a "buddy list." While the terms are interchangeable, the latter term will be used herein.

When the synchronous conferencing client 110 is initialized, it attempts to contact the synchronous conferencing server 106. It is contemplated that the synchronous conferencing client 110 and the synchronous conferencing server 106 can communicate using either a proprietary or an open protocol.

Once a connection is established, the user at the client computer 104 typically logs onto the synchronous conferencing server 108 by providing a login name and password. Upon successful authentication, the synchronous conferencing client 110 sends the synchronous conferencing server 108 connection information, such as the Internet Protocol (IP) address and port number of the client computer 104. The synchronous conferencing client 110 also sends the synchronous conferencing server 106 its buddy list. The synchronous conferencing server 106 returns to the synchronous conferencing client 110 the status and network address of contacts in the buddy list. With this information, the synchronous conferencing client 110 displays the status of each contact in the buddy list, such as "Online", "Offline", and "In a Meeting". The synchronous conferencing server 106 updates the status information by periodically sending new status information about the contacts.

To communicate with an available contact, the user selects the contact from the buddy list. The synchronous conferencing client 110 then provides a user interface for writing and displaying messages to and from the contact. Since the synchronous conferencing client 110 knows the network address of the contact, messages typically pass directly between the synchronous conferencing client 110 at the client computer 104 and a synchronous conferencing client at the contact's computer without involvement of the synchronous conferencing server 106. The contact's synchronous conferencing client receives messages and may respond. Each participant's user interface shows a scrolling dialog of the discussion.

Many synchronous conferencing clients allow users to conduct more than one discussion at a time. For example, the client computer 104 may simultaneously carry out communication sessions between Contact A 112 and Contact B 114. Moreover, the synchronous conferencing client 110 typically provides a separate user interface in a separate window for each session. To communicate with Contact A 112, the user selects one user interface, and to communicate with Contact B 114, the user selects another user interface. Thus, each user interface is dedicated to a separate contact.

Figure 2:
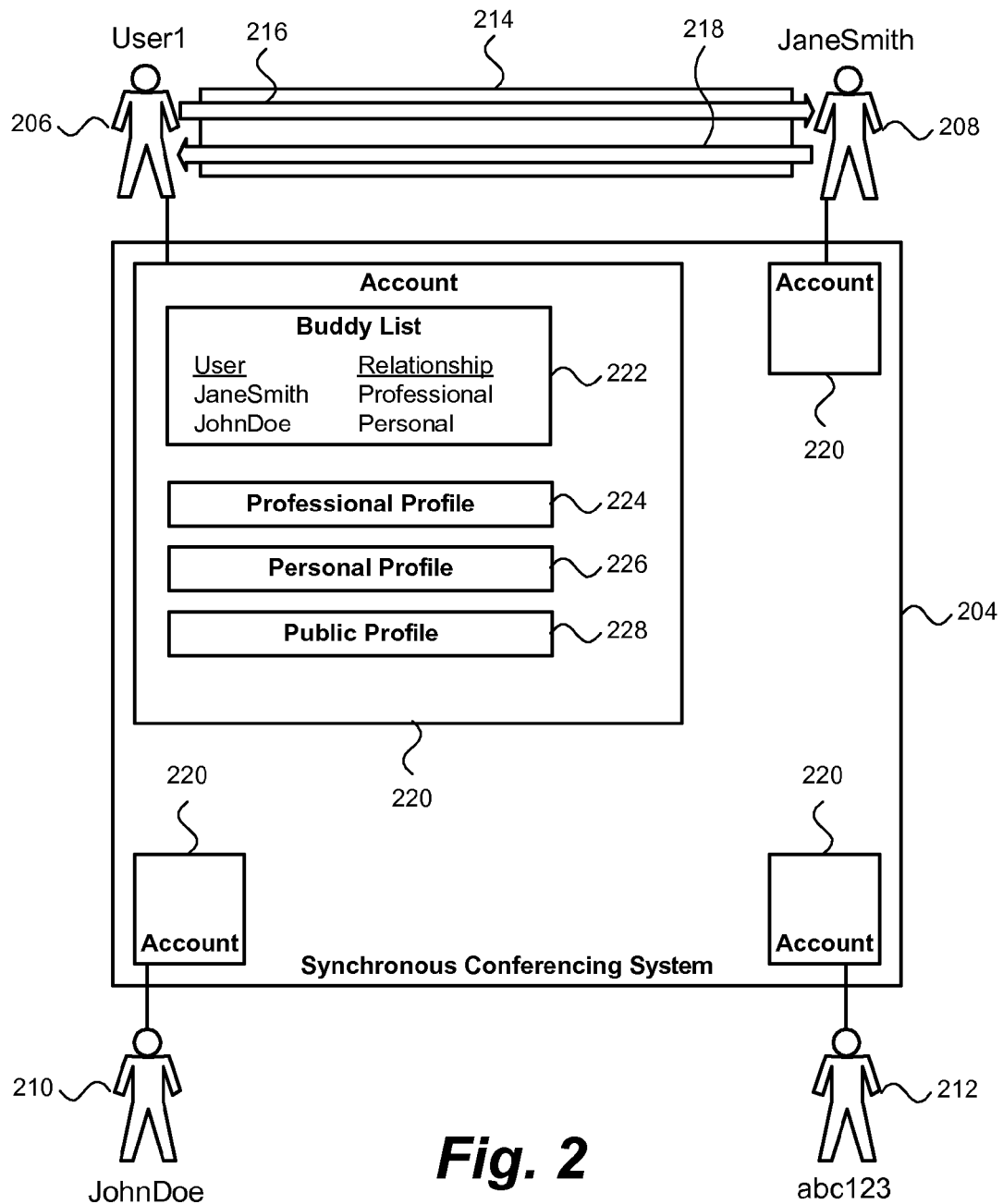
FIG. 2 shows an exemplary synchronous conferencing system embodying the present invention.

Turning now to FIG. 2, an exemplary synchronous conferencing system 204 embodying the present invention is shown. The synchronous conferencing system 204 is configured to facilitate synchronous conferencing. Synchronous conferencing, as the term is used herein, includes any system wherein two or more users communicate in real-time over an electronic network.

In an embodiment of the present invention, the synchronous conferencing system 204 is an Internet Relay Chat network or a subset thereof. In this case, the synchronous conferencing system communicates according to an Internet Relay Chat protocol. It is noted that multiple specifications for Internet Relay Chat protocols have been published. Therefore, the term Internet Relay Chat protocol, as used herein, includes any protocol which is configured to communicate with a substantial number of Internet Relay Chat networks. In another embodiment of the present invention, the synchronous conferencing system is an Internet based chat room. It is emphasized that the synchronous conferencing system 204 is not limited to the specific examples listed above.

A plurality of users may employ the synchronous conferencing system 204 to communicate with each other. The exemplary system of FIG. 2 comprises four users, each denoted by their login name at the synchronous conferencing system. One user is nicknamed User1 206. Another user, JaneSmith 208, is a professional contact of User1. Another user, JohnDoe 210, is a personal friend of User1. Yet another user, abc123 212, has no prior relationship with User1 aside from being a member of the same synchronous conferencing system. It is noted that while four users suffice to demonstrate the present invention, the number of users which may communicate using the method of the present invention is not limited to four. To the contrary, synchronous conferencing systems having thousands or even millions of simultaneous users are known in the art.

A user may open a session 214 to communicate with one or more other users. The exemplary session 214 shown in FIG. 2 connects User1 206 and JaneSmith 208. User1 may send a message 216 to JaneSmith via the session. To respond to the message 216, JaneSmith may similarly send a message 218 to User1 via the session. A session 214 may occur within a user interface such as the exemplary user interface provided by the synchronous conferencing client of FIG. 1.

A user may also request to view information about another user of the synchronous conferencing system 204. In response to such a request, the synchronous conferencing system may transmit identity information about the user who is the subject of the request. Specifically, the information transmitted may include a variety of data fields. The data fields may include any or all of a name, a nickname, a login name and one or more greeting messages.

The data fields may also include one or more images. An image may be an avatar. As the term is used herein, an avatar is any image which represents a user. For example, an avatar may be an image which is a visual representation of the user, such as a digitized photograph. However, an avatar is not required to be an actual likeness of the user. For example, an avatar may be an arbitrary image which the user has selected to represent himself or herself.

Transmitting information about a user to another user of the synchronous conferencing system may additionally occur in contexts other than viewing identity information. In particular, identity information about a user may be transmitted while sending a message originated by that user. Transmitting this information advantageously facilitates functionality such as displaying the nickname of a user in proximity to messages transmitted by that user. Information about a user may also be requested in order to display a buddy list 222. Many synchronous conferencing systems known in the art display, for each user on the buddy list, the nickname and the status of the user.

Each user of the synchronous conferencing system 204 has a synchronous conferencing account 220 at the synchronous conferencing system. A user's account contains identity information. The account may additionally contain any other information regarding the user's relationship with the synchronous conferencing system. It is noted that while FIG. 2 only shows detail for the account of User1, any account may similarly include the specific features shown therein.

An account 220 may include a buddy list 222. A buddy list is a list of users with which the user owning the buddy list is associated. The buddy list may also include properties of the relationships between the user owning the buddy list and the users included on the buddy list. The exemplary buddy list 222 shown for User1 206 includes JaneSmith 208 and John-Doe 210. This indicates that User1 is associated with both JaneSmith and JohnDoe. The buddy list further indicates that JaneSmith is a professional contact of User1 and that John-Doe is a personal contact of User1.

A synchronous conferencing account 220 includes one or more user profiles 224, 226, 228. A user profile contains identity information which is transmitted to other users. Specifically, each user profile includes one or more data fields identifying the user. If an account has two or more user profiles, it is contemplated that at least two of the user profiles identify the user differently. Thus, the same user may express multiple roles or personalities within the same synchronous conferencing account.

The exemplary synchronous conferencing account 220 for User1 206 includes three user profiles. A professional profile 224 contains identity information which is appropriate to a professional setting. For example, the user's real name may be included, the avatar may be a true representation of the user and the greeting may be appropriate to a business setting. A personal profile 226 contains identity information which is appropriate to a personal setting. For example, the user's nickname, avatar and greeting may be less serious in nature than for the professional profile. A public profile 228 contains identity information intended for people not known to User1. For example, it may contain a fictitious name and avatar. The public profile may be designed to achieve anonymity. The public profile may also omit sensitive information such as a telephone number or an electronic mail address. It is emphasized that the number of user profiles is not limited to three. To the contrary, a user may create an arbitrary number of user profiles, and the synchronous conferencing system 204 may fail to impose an upper bound on the number of user profiles per account.

It is emphasized that for any given synchronous conferencing interaction, only one user profile is selected to apply to the interaction. This is the case even if an account 220 includes a plurality of user profiles. For example, if the professional profile 224 is selected, the data fields transmitted contain the identity information included in the professional profile. Identity information included in the personal profile 226 and the public profile 228 are not transmitted in this case.

When a user owning a user profile is interacting with a second user, selecting the active user profile is based on an identification of the second user. It is emphasized that as a result, different users may receive different information about the same user. In the exemplary system of FIG. 2, if the user viewing the information of User1 206 is a professional contact, the professional profile 224 is selected. Thus, the identity information included in the professional profile is transmitted to the user who is a professional contact. If the user viewing the information of User1 is a personal contact, the personal profile 226 is selected. Thus, the identity information included in the personal profile is transmitted to the user who is a personal contact. Otherwise, the default profile or public profile 228 is selected. Thus, the identity information included in the public profile is transmitted to the user with whom no prior relationship exists. It is emphasized that each user has a different "view" of the identity information based on which user profile is selected, which in turn (in this example) depends on the relationship with the user receiving the information.

A user may set preferences which determine the mapping of other users to user profiles. In an embodiment of the present invention, the preferences are stored at the buddy list 222. Specifically, for a specific user included on the buddy list, the buddy list may additionally specify the user profile which is selected when interacting with that user. In the exemplary system of FIG. 2, the buddy list specifies that JaneSmith 208 is a professional contact. Therefore, the professional profile 224 is selected when interacting with JaneSmith. The buddy list further specifies that JohnDoe 210 is a personal contact. Therefore, the personal profile 226 is selected when interacting with JohnDoe. The buddy list does not contain abc123 222 at all. Therefore, the public profile 228 is selected when interacting with abc123.

The preceding example illustrates how the present invention beneficially allows interacting with different users in a manner appropriate to each user within a single account at a synchronous conferencing system. Notably, the present invention allows interacting with professional contacts in a professional manner and personal contacts in a personal manner. Furthermore, the present invention advantageously allows restricting identity information where appropriate, such as in the case where no previous relationship with a given user exists.

Figure 3:
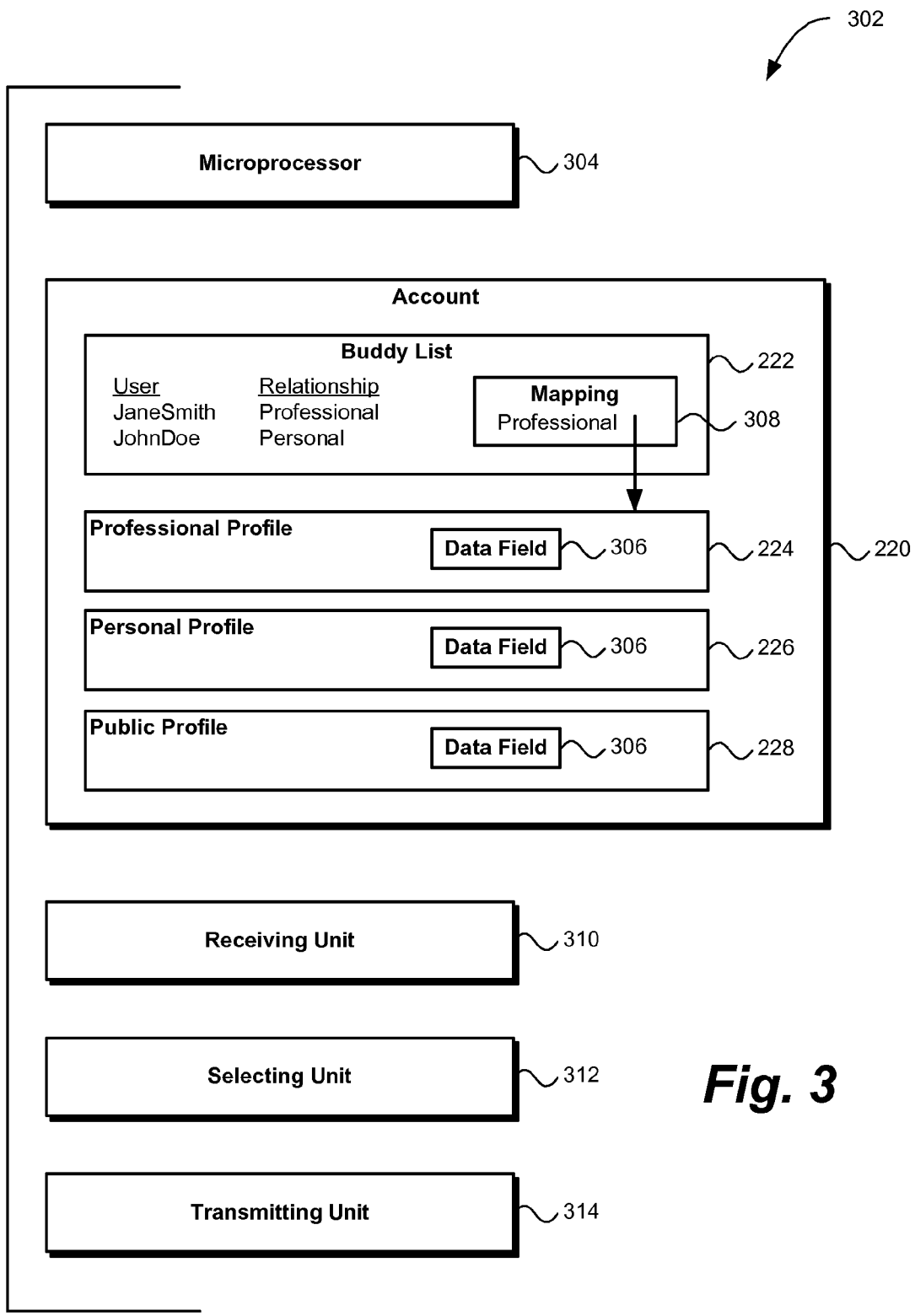
FIG. 3 demonstrates a system for managing multiple profiles in a synchronous conferencing system.

Turning now to FIG. 3, a system 302 for managing multiple profiles in a synchronous conferencing system is demonstrated. The system may exist within a synchronous conferencing system such as the exemplary synchronous conferencing system 204 shown in FIG. 2. The system may also exist partially within such a synchronous conferencing system and partially within a synchronous conferencing client such as the exemplary synchronous conferencing client 110 shown in FIG. 1.

The system 302 includes a microprocessor 304. The microprocessor is configured to execute program code embodied in computer readable memory. As used herein, computer readable memory includes various memories known in the art, such as, but not limited to, read-only memory (ROM), random-access memory (RAM), FLASH memory, volatile memory, non-volatile memory, optical memory, and magnetic memory.

The system 302 further includes a synchronous conferencing account 220 for a first user of a synchronous conferencing system. Specific details regarding the synchronous conferencing account are outlined above in regards to FIG. 2. The synchronous conferencing account 220 includes at least one user profile 224, 226, 228 for the first user. In the exemplary system 302, the account includes a professional profile 224, a personal profile 226 and a public or default profile 228. Additional information about the three exemplary user profiles is provided above in regards to FIG. 2. Furthermore, the account may include a buddy list 222.

Each user profile 224, 226, 228 is associated with one or more data fields 306. A data field identifies the first user. It is contemplated that if two or more user profiles exist, at least two of the plurality of user profiles identify the first user differently. In an embodiment of the present invention, the data fields are limited to information about the user.

The data fields identifying the first user may include a name, which may include a given name and/or a surname. The data fields may also include a nickname and/or a login name. The data fields may also include one or more greeting messages. The data fields may also include a message conveying the status of the user. A status message may indicate whether a user is online or offline. A status message may also indicate other conditions such as being in a meeting or being busy. In an embodiment of the present invention, data fields may include types of information which may be stored using the Lightweight Directory Access Protocol (LDAP), such as a telephone number or the name of the person in an organizational chart to whom an employee reports.

The user profiles 224, 226, 228 may include disjoint identity information. As used herein, the user profiles are considered to include disjoint identity information if the following conditions exist. First, at least two user profiles must exist, as it is meaningless to assert that a single user profile is disjoint with itself. The two user profiles may be referred to as the first user profile and the second user profile without loss of generality. It is noted that if three or more user profiles exist, this definition applies if the conditions are true for any of the two user profiles. Second, a first value included in the first user profile is not included in the second user profile. Third, a second value included in the second user profile is not included in the first user profile. Fourth, neither the first value nor the second value indicates an absence of data. The special value Null may indicate an absence of data. Null is a construct available in many programming languages and environments known in the art which indicates that no data exists in a context, such a specific field, where that data would normally exist. An absence of data may also be indicated by character data containing no meaningful semantic content, including without limitation a string containing zero characters, a string containing only whitespace characters, or a textual value such as "None" or "N/A" which indicates that a field does not contain meaningful data. An absence of data may also be indicated by image data containing no meaningful visual content, including without limitation a monochromatic image or an image containing only language such as "No image available."

When user profiles are disjoint as defined above, identity information is beneficially replaced depending on the identification of the user viewing the user profile. For example, as noted above in regards to FIG. 2, the professional profile 224 may include a data field 306 whose value is an avatar which is a true representation of the user. In the personal profile 226, the value of the same data field is instead an avatar which is less serious in nature than for the professional profile. Thus, for the same field, different data are displayed to different users.

Differences in user profiles may also beneficially cause identity information to be omitted depending on the identification of the user viewing the user profile. For example, the data field 306 which contains an avatar in the professional profile 224 and the personal profile 226 (as noted above) may, in the public profile 228, instead contain no data. The data field in the public profile could also include a placeholder image having the words, "No image available."

In an embodiment of the present invention, user profiles 224, 226, 228 are implemented using a table in a database. Each record or row in the table represents a different user profile. Each data field 306 is stored in a different field or column within the table. Thus, the value of a specific data field for a specific user profile can be determined by querying for the appropriate record and field in the table.

In another embodiment of the present invention, user profiles 224, 226, 228 are implemented using a plurality of tables in a database. Each table would contain data for a different data field 306. For example, names could be stored in one table and avatars could be stored in a second table.

In another embodiment of the present invention, each possible permutation of a table or tables in a database, such as those described in the previous two embodiments, is considered to be a user profile. Specifically, the present invention may select, from different tables, an entry in each table to apply to a specific user included at the buddy list 222. A table can contain, for example, nicknames, avatars or login names.

The synchronous conferencing account 220 may further include one or more mappings 308. Each mapping associates one or more specific identifications of other users of the synchronous conferencing system with one of the user profiles 224, 226, 228. The mappings may be located at a buddy list 222.

Even if mappings 308 exist, a mapping may not necessarily exist for every user of the synchronous conferencing system. Therefore, one of the user profiles 224, 226, 228 may be a default profile for other users of the synchronous conferencing system not specifically identified in the one or more mappings. In the exemplary system of FIG. 3, the public profile 228 is the default profile.

In an embodiment of the present invention, a mapping 308 may specify a group containing a plurality of users of the synchronous conferencing system. Each user included in the group is associated with the user profile 224, 226, 228 specified by the mapping. The groups may be defined by the buddy list 222. For example, the buddy list may define a group called "Coworkers" and another group called "Friends". Each user included on the buddy list may be classified into one of the two groups. A mapping may associate the Coworkers group with the professional profile 224, and another mapping may associate the Friends group with the personal profile 226. Thus, the professional profile will be selected when interacting with all users included in the Coworkers group, and the personal profile will be selected when interacting with all users included in the Friends group.

The system 302 further includes a receiving unit 310. The receiving unit is further configured to receive a request from a second user of the synchronous conferencing system to communicate with the first user. The request includes an identification of the second user. The identification of the second user may be any data uniquely identifying the second user. The identification of the second user may be a login name, a nickname or a unique numeric identifier. The receiving unit 310 may additionally be configured to receive a message from the second user.

The system 302 further includes a selecting unit 312. The selecting unit is configured to select one of the plurality of user profiles of the first user based on the identification of the second user. The selecting unit 312 may perform the algorithm demonstrated in FIG. 5 to select a user profile.

The system 302 further includes a transmitting unit 314. The transmitting unit is configured to transmit the one or more data fields identifying the first user associated with the selected user profile to the second user. The transmitting unit 314 may additionally be configured to transmit a message to the second user.

Figure 4:
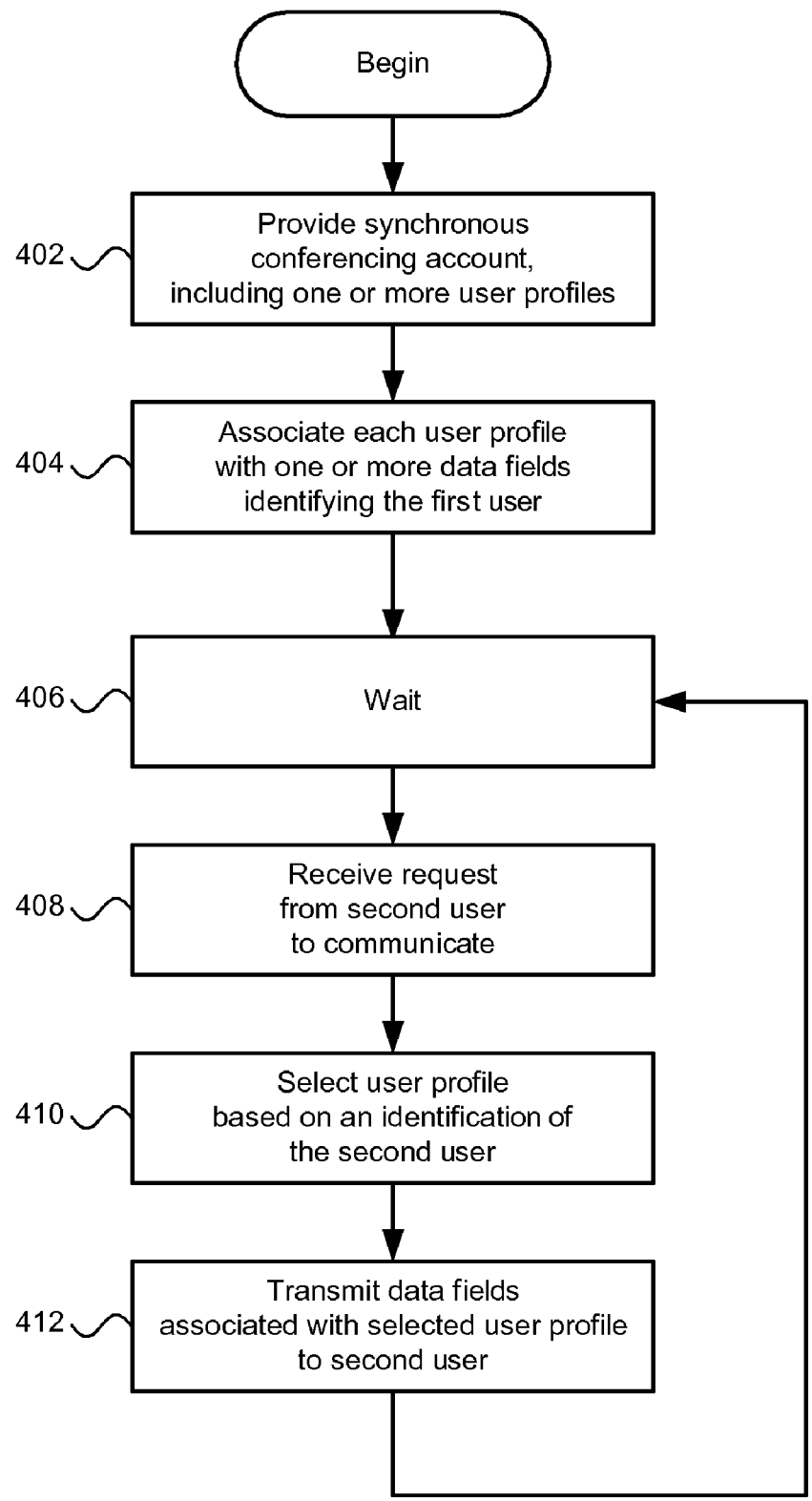
FIG. 4 demonstrates a flowchart of a method for managing multiple profiles in a synchronous conferencing system.

Turning now to FIG. 4, a flowchart of a method for managing multiple profiles in a synchronous conferencing system is demonstrated. The operations shown in FIG. 4 may be performed by a system such as the exemplary system shown in FIG. 3.

At providing operation 402, a synchronous conferencing account is provided for a first user of the synchronous conferencing system. The account may be located at a synchronous conferencing system. The account may have similar structural elements to the synchronous conferencing account 220 shown in FIG. 2 and FIG. 3. Providing the account may comprise allowing a user to execute a procedure to create an account. Providing operation 402 further comprises instantiating one or more user profiles for the first user so that the user profiles are included within the synchronous conferencing account. The user profiles may have similar structural elements to the user profiles 224, 226, 228 shown in FIG. 2 and FIG. 3. After providing operation 402 is completed, control passes to associating operation 404.

At associating operation 404, each of the user profiles may be associated with one or more data fields identifying the first user. It is contemplated that at least two of the plurality of user profiles identify the first user differently. The data fields may have similar structural elements to the data fields 306 shown in FIG. 3. In particular, the data fields identifying the first user may include a name, a nickname, a login name, and at least one avatar. Associating operation 404 may include providing a user interface for the first user to input identity information into the data fields.

Associating operation 404 may further comprise associating each of the plurality of user profiles with one or more data fields identifying the first user. The associations may have similar structural elements to the mappings 308 shown in FIG. 3. In particular, each of the one or more mappings may associate one or more specific identifications of other users of the synchronous conferencing system with one of the user profiles. Associating operation 404 may further comprise specifying one of user profiles to be a default profile for other users of the synchronous conferencing system not specifically identified in the one or more mappings.

After associating operation 404 is completed, control passes to waiting operation 406. It is contemplated that initialization of the synchronous conferencing account is complete at this point.

At waiting operation 406, an idle state occurs until a request from a second user of the synchronous conferencing system is received. The first user may elect to perform other actions during waiting operation 406. In particular, the first user may transmit a request to another user of the synchronous conferencing system to communicate with that user. The first user may also perform administrative actions such as updating preference settings or identity information. The first user may also log off the synchronous conferencing system, in which case processing terminates.

At receiving operation 408, a request is received from a second user of the synchronous conferencing system to communicate with the first user. The request includes an identification of the second user. The identification of the second user may be any data uniquely identifying the second user. The identification of the second user may be a login name, a nickname or a unique numeric identifier. Receiving operation 408 may additionally comprise receiving a message from the second user. A message thus received may be displayed to the first user. After receiving operation 408 is completed, control passes to selecting operation 410.

At selecting operation 410, one of the user profiles of the first user is selected based on the identification of the second user. Selecting operation 410 may comprise the specific operations outlined in FIG. 5. After selecting operation 410 is completed, control passes to transmitting operation 412.

At transmitting operation 412, the one or more data fields identifying the first user associated with the user profile selected at selecting operation 410 are transmitted to the second user. Transmitting operation 412 may additionally comprise receiving a message from the first user and transmitting the message to the second user.

After transmitting operation 412 is completed, control passes to waiting operation 406. It is noted that additional messages may be exchanged between the first user and the second user within the same communications session. In an embodiment of the present invention, selecting operation 410 is only performed once per communications session. Receiving operation 408 may be repeated to process subsequent messages received by the first user during the communications session. Transmitting operation 412 may be repeated to process subsequent messages transmitted by the first user during the communications session, except that transmitting the data fields identifying the first user may be omitted.

Figure 5:
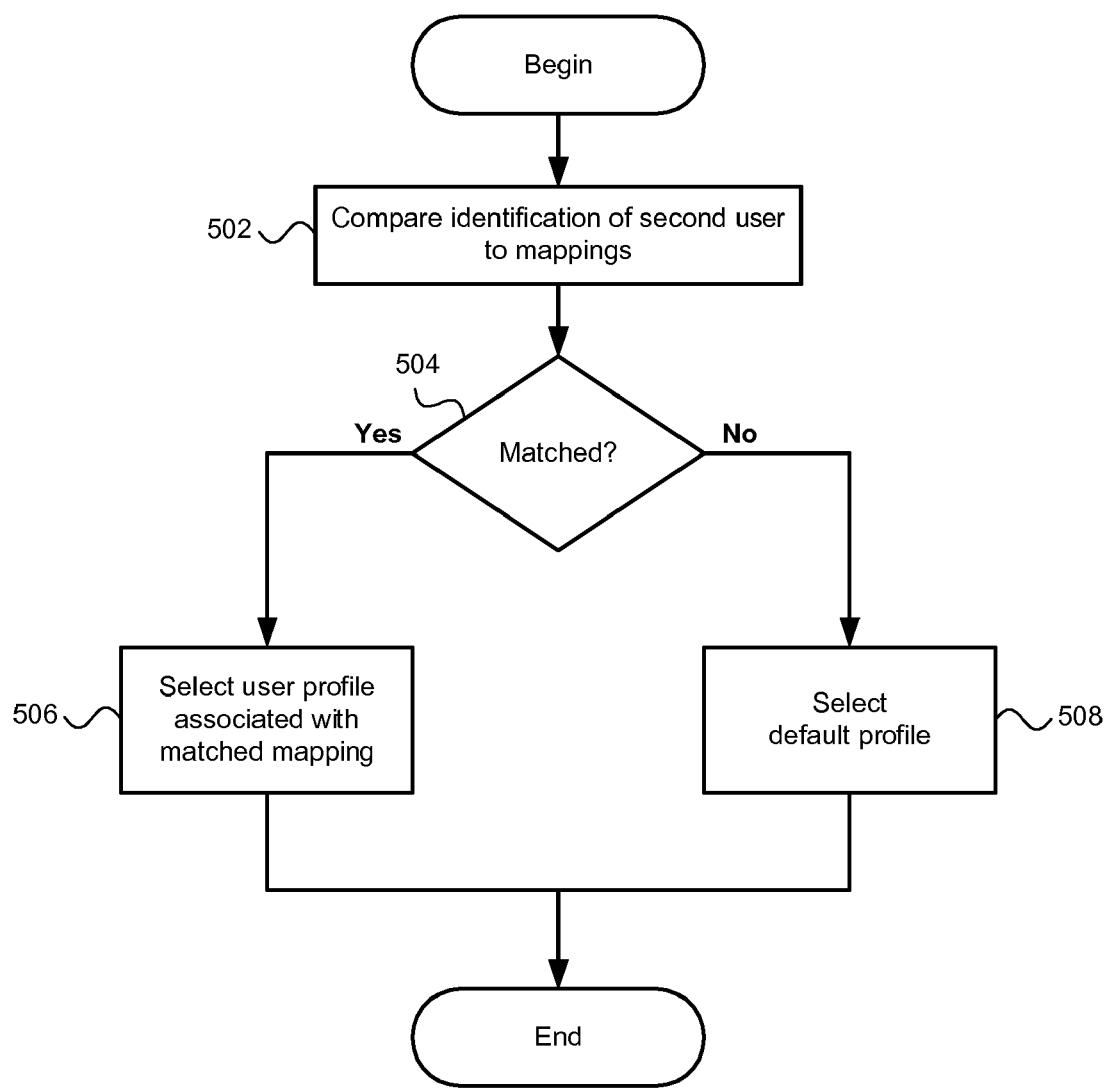
FIG. 5 shows a flowchart demonstrating an exemplary method for selecting a user profile based on the identification of the second user.

FIG. 5 shows a flowchart demonstrating an exemplary method for selecting a user profile based on the identification of the second user.

At comparing operation 502, an identification of the second user is compared to the specific identifications of other users of the synchronous conferencing system included in the one or more mappings. The mappings may have similar structural elements to the mappings 308 shown in FIG. 3. In the embodiment discussed above regarding FIG. 3 wherein a mapping may identify a group rather than one or more users, comparing operation 502 may comprise determining the identity of a group to which the user belongs. After comparing operation 502 is completed, control passes to determining operation 504.

At determining operation 504, it is determined whether the identification of the second user does not match the specific identifications of other users of the synchronous conferencing system included in any of the one or more mappings. If the identification of the second user does not match any mapping, control passes to defaulting operation 508. Otherwise, control passes to selecting operation 506.

At selecting operation 506, the user profile associated with the mapping for which the identification of the second user matches the specific identifications of other users of the synchronous conferencing system is selected. Thus, processing continues based on the selected user profile.

At defaulting operation 508, the default profile is selected. Thus, processing continues based on the default profile.

Figure 6:
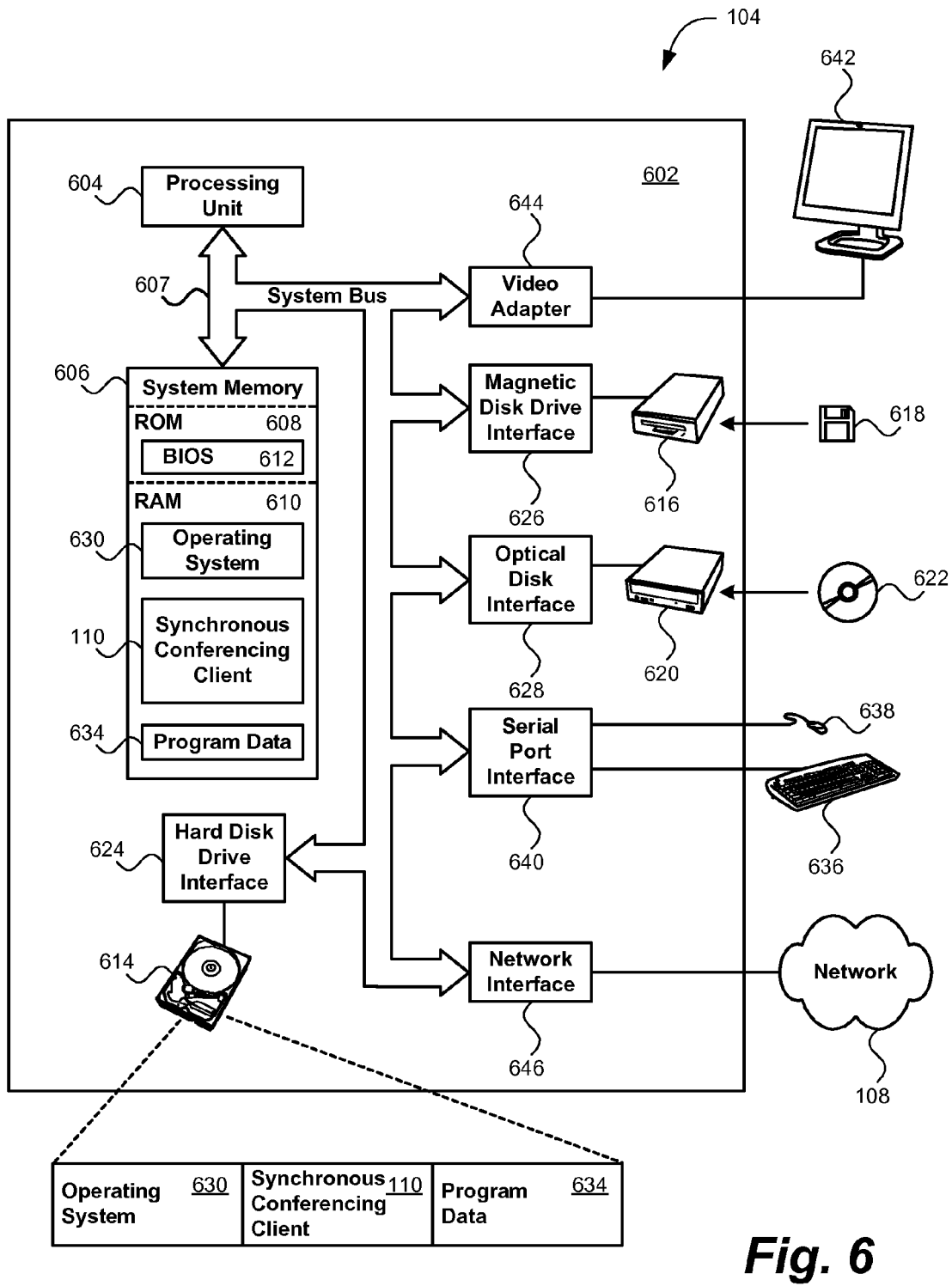
FIG. 6 shows an illustrative embodiment of a client computer embodying the present invention.

With reference to FIG. 6, an illustrative embodiment of the client computer 104 is shown. The client computer 104 includes a processing unit 604, a system memory 606, and a system bus 607 that couples the system memory 606 to the processing unit 604. The system memory 606 includes read only memory (ROM) 608 and random access memory (RAM) 610. A basic input/output system (BIOS) 612, containing the basic routines that help to transfer information between elements within the computer 104, such as during start-up, is stored in ROM 608.

The computer 104 further includes a hard disk drive 614, a magnetic disk drive 616 (to read from and write to a removable magnetic disk 618), and an optical disk drive 620 (for reading a CD-ROM disk 622 or to read from and write to other optical media). The hard disk drive 614, magnetic disk drive 616, and optical disk drive 620 are connected to the system bus 608 by a hard disk interface 624, a magnetic disk interface 626, and an optical disk interface 628, respectively. The drives and their associated computer readable media provide nonvolatile storage for the computer 104. Although computer readable media refers to a hard disk, removable magnetic media and removable optical media, it should be appreciated by those skilled in the art that other types of media that are readable by a computer, such as flash memory cards, may also be used in the illustrative client computer 104.

A number of program modules may be stored in the drives and RAM 610, including an operating system 630, a synchronous conferencing application or client 110, program data 634, and other program modules (not shown). As discussed above, the synchronous conferencing client 110 is configured to send and receive messages across a computer network.

A user may enter commands and information into the computer 104 through a keyboard 636 and pointing device, such as a mouse 638. Other input devices (not shown) may include a microphone, modem, joystick, game pad, satellite dish, scanner, or the like. These and other input devices are often connected to the processing unit through a serial port interface 640 that is coupled to the system bus 608.

A monitor 642 or other type of display device is also connected to the system bus 608 via an interface, such as a video adapter 644. In addition to the monitor, the computer 104 may include other peripheral output devices (not shown), such as speakers and printers.

The computer 104 operates in a networked environment using logical connections to one or more remote devices. The remote device may be a server, a router, a peer device or other common network node. When used in a networking environment, the computer 104 is typically connected to the network 108 through a network interface 646. In a network environment, program modules depicted relative to the computer 104, or portions thereof, may be stored in one or more remote memory storage devices.

Embodiments of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method for managing multiple profiles in a synchronous conferencing system, the method comprising:
providing a synchronous conferencing account for a first user of the synchronous conferencing system, the synchronous conferencing account including a plurality of user profiles for the first user, at least two of the plurality of user profiles identifying the first user differently;
associating each of the plurality of user profiles with a different name that identifies the first user;
receiving a request from a second user of the synchronous conferencing system to communicate with the first user, the request including an identification of the second user;
selecting one of the plurality of user profiles of the first user based on the identification of the second user; and
transmitting the name identifying the first user associated with the selected user profile to the second user.

2. The method of claim 1, wherein the synchronous conferencing account includes one or more mappings, each of the one or more mappings associating one or more specific identifications of other users of the synchronous conferencing system with one of the plurality of user profiles.

3. The method of claim 2, wherein one of the plurality of user profiles is a default profile for other users of the synchronous conferencing system not specifically identified in the one or more mappings.

4. The method of claim 3, wherein selecting one of the plurality of user profiles includes:
comparing the identification of the second user to the specific identifications of other users of the synchronous conferencing system included in the one or more mappings;
selecting the user profile associated with the mapping for which the identification of the second user matches the specific identifications of other users of the synchronous conferencing system; and
selecting the default profile if the identification of the second user does not match the specific identifications of other users of the synchronous conferencing system included in any of the one or more mappings.

5. The method of claim 1, wherein the name identifying the first user includes at least one of a nickname and a login name.

6. The method of claim 1, further comprising:
wherein the plurality of user profiles includes a first user profile and a second user profile;
a first value included in the first user profile is not included in the second user profile, the first value does not indicate an absence of data; and
a second value included in the second user profile is not included in the first user profile, the second value does not indicate an absence of data.

7. The method of claim 1, further comprising communicating according to an Internet Relay Chat protocol.

8. The method of claim 1, wherein the synchronous conferencing system is an Internet based chat room.

9. A system for managing multiple profiles in a synchronous conferencing system, the system comprising:
a microprocessor configured to execute program code embodied in computer readable memory;
a synchronous conferencing account for a first user of a synchronous conferencing system, the synchronous conferencing account including a plurality of user profiles for the first user, each of the plurality of user profiles associated with a different name that identifies the first user, at least two of the plurality of user profiles identifying the first user differently;
a receiving unit configured to receive a request from a second user of the synchronous conferencing system to communicate with the first user, the request including an identification of the second user;
a selecting unit configured to select one of the plurality of user profiles of the first user based on the identification of the second user; and
a transmitting unit configured to transmit the name identifying the first user associated with the selected user profile to the second user.

10. The system of claim 9, wherein the synchronous conferencing account includes one or more mappings, each of the one or more mappings associating one or more specific identifications of other users of the synchronous conferencing system with one of the plurality of user profiles.

11. The system of claim 9, wherein one of the plurality of user profiles is a default profile for other users of the synchronous conferencing system not specifically identified in the one or more mappings.

12. The system of claim 9, wherein the selecting unit is further configured to:
compare the identification of the second user to the specific identifications of other users of the synchronous conferencing system included in the one or more mappings;
select the user profile associated with the mapping for which the identification of the second user matches the specific identifications of other users of the synchronous conferencing system; and
select the default profile if the identification of the second user does not match the specific identifications of other users of the synchronous conferencing system included in any of the one or more mappings.

13. The system of claim 9, wherein the name identifying the first user includes at least one of a nickname and a login name.

14. The system of claim 9, further comprising:
wherein the plurality of user profiles includes a first user profile and a second user profile;
a first value included in the first user profile is not included in the second user profile, the first value does not indicate an absence of data; and
a second value included in the second user profile is not included in the first user profile, the second value does not indicate an absence of data.

15. A computer program product embodied in computer readable memory comprising:
computer readable program codes coupled to the computer readable memory for managing multiple profiles in a synchronous conferencing system, the computer readable program codes configured to cause the program to:
provide a synchronous conferencing account for a first user of the synchronous conferencing system, the synchronous conferencing account including a plurality of user profiles for the first user, at least two of the plurality of user profiles identifying the first user differently;
associate each of the plurality of user profiles with a different name that identifies the first user;
receive a request from a second user of the synchronous conferencing system to communicate with the first user, the request including an identification of the second user;
select one of the plurality of user profiles of the first user based on the identification of the second user; and
transmit the name identifying the first user associated with the selected user profile to the second user.

16. The computer program product of claim 15, wherein the synchronous conferencing account includes one or more mappings, each of the one or more mappings associating one or more specific identifications of other users of the synchronous conferencing system with one of the plurality of user profiles.

17. The computer program product of claim 16, wherein one of the plurality of user profiles is a default profile for other users of the synchronous conferencing system not specifically identified in the one or more mappings.

18. The computer program product of claim 17, wherein selecting one of the plurality of user profiles includes:
comparing the identification of the second user to the specific identifications of other users of the synchronous conferencing system included in the one or more mappings;
selecting the user profile associated with the mapping for which the identification of the second user matches the specific identifications of other users of the synchronous conferencing system; and selecting the default profile if the identification of the second user does not match the specific identifications of other users of the synchronous conferencing system included in any of the one or more mappings.

19. The computer program product of claim 15, wherein the name identifying the first user includes at least one of a nickname and a login name.

20. The computer program product of claim 15, further comprising:

wherein the plurality of user profiles includes a first user profile and a second user profile;

a first value included in the first user profile is not included in the second user profile, the first value does not indicate an absence of data; and a second value included in the second user profile is not included in the first user profile, the second value does not indicate an absence of data.

* * * * *